US012746818B2

(12) United States Patent
Schlegel

(10) Patent No.: US 12,746,818 B2
(45) Date of Patent: Sep. 29, 2026

(54) METHOD FOR ADJUSTING AN INTERIOR ELEMENT OF A VEHICLE, AND EMERGENCY ASSISTANCE SYSTEM AND VEHICLE HAVING AN EMERGENCY ASSISTANCE SYSTEM

(71) Applicant: CARIAD SE, Wolfsburg (DE)

(72) Inventor: Christian Schlegel, Wolfsburg (DE)

(73) Assignee: Cariad SE, Wolfsburg (DE)

( * ) Notice: Subject to any disclaimer, the term of this patent is extended or adjusted under 35 U.S.C. 154(b) by 27 days.

(21) Appl. No.: 18/862,844

(22) PCT Filed: Apr. 6, 2023

(86) PCT No.: PCT/EP2023/059228
§ 371 (c)(1),
(2) Date: Nov. 4, 2024

(87) PCT Pub. No.: WO2023/213498
PCT Pub. Date: Nov. 9, 2023

(65) Prior Publication Data

US 2025/0353371 A1 Nov. 20, 2025

(30) Foreign Application Priority Data

May 6, 2022 (DE) .................... 10 2022 111 362.0

(51) Int. Cl.
*B60K 28/06* (2006.01)
*B60N 2/00* (2006.01)
(Continued)

(52) U.S. Cl.
CPC ............ *B60K 28/06* (2013.01); *B60N 2/0022* (2023.08); *B60N 2/0256* (2023.08); *B60N 2/06* (2013.01);
(Continued)

(58) Field of Classification Search
CPC .... B60K 28/06; B60N 2/0022; B60N 2/0256; B60N 2/06; B60N 2/0023; G06V 20/597;
(Continued)

(56) References Cited

U.S. PATENT DOCUMENTS 6,922,622 B2 7/2005 Dulin et al.
2010/0019546 A1 1/2010 Stephens
(Continued)

FOREIGN PATENT DOCUMENTS

DE 10-2006-045383 B3 12/2007
DE 10-2015-105581 A1 5/2016
(Continued)

OTHER PUBLICATIONS

Machine translation of JP-7787722-B2.*
Machine translation of WO-2025154551-A1.*

*Primary Examiner* — Robert T Nguyen
(74) *Attorney, Agent, or Firm* — Seed Intellectual Property Law Group LLP

(57) ABSTRACT

The disclosure relates to a method for adjusting at least one interior element of a vehicle. In this process, an occupant state signal is detected which signals that a specified pathological state of an occupant of the vehicle at least restricts their ability to drive the vehicle to a specified extent. An emergency assistance system is then activated to perform at least one support measure for the occupant. An adjustment measure is then performed in order to adjust at least one interior element of the vehicle to a specified target position. The target position is chosen here such that a movement space delimited by the at least one interior element is increased for access to and/or exit for the occupant.

11 Claims, 2 Drawing Sheets

(51) Int. Cl.
*B60N 2/02* (2006.01)
*B60N 2/06* (2006.01)
*G06V 20/59* (2022.01)

(52) U.S. Cl.
CPC ........ *G06V 20/597* (2022.01); *B60Y 2302/05* (2013.01)

(58) Field of Classification Search
CPC . B60Y 2302/05; A61B 5/0077; A61B 5/0205; A61B 5/18; A61B 5/746; A61B 5/7465; B60W 30/18054; B60W 2540/221; B60R 16/037
See application file for complete search history.

(56) References Cited

U.S. PATENT DOCUMENTS

| | | | | |
|---|---|---|---|---|
| 2017/0297606 | A1 | 10/2017 | Kim et al. | |
| 2019/0061772 | A1* | 2/2019 | Prinz ................. | B60W 50/0098 |
| 2019/0370577 | A1* | 12/2019 | Meng ................... | G05D 1/0061 |
| 2020/0047770 | A1* | 2/2020 | Ozawa ................. | G05D 1/0088 |
| 2021/0323446 | A1 | 10/2021 | Christensen et al. | |

FOREIGN PATENT DOCUMENTS

| | | | | | |
|---|---|---|---|---|---|
| JP | 7787722 | B2 * | 12/2025 | | |
| WO | WO-2025154551 | A1 * | 7/2025 | ............... | G05D 1/85 |

* cited by examiner

METHOD FOR ADJUSTING AN INTERIOR ELEMENT OF A VEHICLE, AND EMERGENCY ASSISTANCE SYSTEM AND VEHICLE HAVING AN EMERGENCY ASSISTANCE SYSTEM

BACKGROUND

Technical Field

The disclosure relates to a method for adjusting an interior element of a vehicle. Furthermore, the disclosure also relates to an emergency assistance system for a vehicle by way of which the adjusting of the at least one interior element can be triggered. Finally, the disclosure also relates to a vehicle having a corresponding emergency assistance system.

Description of the Related Art

In the interior of a vehicle, an interior element, such as, for example, a vehicle seat or a steering wheel, can be adjusted in its position in a manner known per se. Such an adjustment measure can be performed, for example, to adapt the position of the interior element to the physique of the occupant and/or to simplify exit from or entry into the vehicle for an occupant. Said adjusting can be performed manually or in an automated manner, i.e., without the occupant having to do anything.

DE 10 2006 045 383 B3, for example, discloses a vehicle with an exit aid that is activated after an accident. The exit aid is used to adjust a seat or a steering wheel in an automated manner. This makes it easier for rescue workers, for example, to free an occupant from the crashed vehicle or for the occupant to escape from the crashed vehicle.

US 2010/0019546 A1 also discloses an automatically adjustable vehicle seat and an automatically swiveling steering wheel to make it easier to rescue passengers from a crashed vehicle after an accident.

There may also be situations in which an adjustment measure for a steering wheel or a seat is provided in an intact vehicle, i.e., without an accident having occurred. For example, there are vehicles that identify which person wants to use the vehicle seat and then adjust the vehicle seat and/or the steering wheel to a preferred position assigned to the person.

In addition, US 2017/0297606 A1 discloses a system for automatically adapting a vehicle steering wheel. The steering wheel is designed to be foldable and can, depending on the situation, be stowed in the dashboard while driving, with the vehicle then operating on autopilot. Said stowing is activated, for example, when the driver is tired or inattentive or when an impending accident is detected or the arrival of an ambulance is captured.

BRIEF SUMMARY

Embodiments of the present disclosure expand the use of adjustment measures for an interior element of a vehicle.

In order to provide an additional field of application for an adjustment measure, disclosed is a method for adjusting at least one interior element of a vehicle. The method comprises the following steps: First, an occupant state signal is detected which signals that a specified pathological state of an occupant of the vehicle at least restricts their ability to drive the vehicle to a specified extent. The occupant state signal thus indicates that the occupant's participation in road traffic is at least partially or completely impaired. This can happen, for example, if there is a medical emergency. An emergency assistance system of the vehicle or a specified emergency protocol is then activated and an emergency signal is provided to perform at least one support measure for the occupant. The desired adjustment measure is only performed if the emergency signal is present, for example if it is detected, and it is thus ensured that the emergency assistant or the emergency protocol has been activated. For this purpose, an adjustment drive of the at least one interior element whose position in the interior of the vehicle is adjustable is controlled to adjust it to a specified target position. In the target position, a movement space delimited by way of the respective interior element is increased for entry and/or exit of the occupant.

In other words, the aim is to check whether there is a medical emergency that requires emergency assistance from the vehicle, i.e., automated support, for example to enable medical care by an emergency service. The support measure is therefore carried out by the vehicle in an automated manner. The support measure can, for example, be an automatic stopping, i.e., an emergency stop of the vehicle. The movement space should then be increased, in particular maximized. The aim is to create free space in order to facilitate any necessary medical measures or the rescue of the occupant, or to make it easier for the occupant to exit the vehicle.

In the present case, "adjusting" means changing the relative position of the interior element in the interior from a first position (starting position) to a different second position (target position). In the present case, said adjusting can comprise, for example, shifting, pivoting and/or extending or retracting. The direction of adjustment and the number of degrees of freedom for adjusting can be specified depending on a mechanical structure or design of the interior element. Various adjustment options for interior elements, i.e., possible adjustment measures, will be described in more detail below.

The occupant can, for example, be a driver or a co-driver or a passenger in the vehicle. For the co-driver or passenger as an occupant, for example, a pathological state that generally requires professional or trained medical care can then be the key factor. In the present case, the pathological state can be, for example, an infarction, such as a heart attack, a stroke, paralysis, fainting or another impairment of the occupant that requires said medical care.

The disclosure also includes embodiments that result in additional advantages.

According to one embodiment, a seat adjustment drive of a vehicle seat and/or a steering wheel adjustment drive of a steering wheel of the vehicle is controlled to increase the movement space.

The aforementioned interior element can thus be a steering wheel and/or a vehicle seat. A vehicle seat can be, for example, a driver's seat, a co-driver seat and/or a rear seat and/or a back bench. The movement space can thus be specified by a distance between the steering wheel or the driver's seat or between a front seat or a rear seat or between a co-driver seat and the dashboard.

Corresponding adjustment options within the meaning of the disclosure for a vehicle seat and/or a steering wheel are known per se. An exemplary selection of adjustment measures is listed below. In order to increase the movement space, the steering wheel can, for example, be extended or retracted perpendicular to a steering plane. Steering plane refers to a plane in which the steering wheel is rotated about a central axis, i.e., about the steering rod, for steering. As a result, the steering wheel can be positioned closer to the dashboard or closer to the vehicle seat. For this purpose, a steering column of the steering wheel can be designed to be variable in length, for example as a telescopic rail or telescopic rod. Additionally or alternatively, the steering wheel can be adjusted parallel to the steering plane, in particular in the direction of the vehicle roof (top) or vehicle floor (bottom). Additionally or alternatively, the steering wheel can be designed to be rotatable or pivotable perpendicular to the steering plane. The steering wheel can thus be folded away, for example in the direction of the dashboard. Additionally or alternatively, a steering wheel designed to be foldable is of course conceivable, for example, which can be stowed in the dashboard in a known manner. Of course, any combination of the adjustment measures described is also possible. To increase the movement space, the vehicle seat is adjustable in a known manner parallel to the direction of travel or a vehicle base/vehicle floor. This means that the seat can be displaced or adjusted in the direction of the dashboard (front) or in the direction of the rear (back) of the vehicle. Additionally or alternatively, the vehicle seat can be adjusted perpendicular to the vehicle floor, i.e., up or down.

Preferably, the target position for the respective interior element is chosen so that the movement space is maximum. For this purpose, the vehicle seat can, for example, be completely moved back and down and/or the steering wheel can be completely moved up and retracted.

Alternatively, an interior element can be, for example, a dashboard and/or a respective actuation pedal (accelerator pedal, brake pedal, clutch pedal) and/or a gear stick.

According to a further embodiment, the target position of the interior element is chosen depending on an access area provided in a body for the occupant to enter into the interior, so that the movement space delimited by the interior element and the access area is increased.

In other words, to increase the movement space, not only the possible positions that the interior element can assume by adjusting it, but also the dimensions of an access area are taken into account. The access area can be, for example, a door frame in the body of the vehicle. Thus, for example, a position of an A and/or B pillar for the front seats of the vehicle can be taken into account when setting the target position. For the rear seat(s), it can be, for example, the position of a B and/or C pillar of the body. In particular, it is therefore a matter of adjusting or resetting the vehicle seat and/or the steering wheel only to such an extent that the door frame does not obscure the exit for the occupant or the access to the occupant.

According to a further embodiment, the support measure comprises controlling at least one driving-supporting actuator of the vehicle with the emergency signal to perform a stopping maneuver. By activating the emergency assistance system, the vehicle can thus be stopped in a controlled manner, taking into account the specified traffic regulations. In particular, there is no emergency braking unless required by traffic circumstances outside the vehicle. The driving-supporting actuator can be included in or at least be controllable by a so-called driver assistance system. The actuator can be, for example, a control device of the driver assistance system and/or a brake control unit and/or an engine control unit and/or a control unit of a steering system. A driver assistance system within the meaning of the disclosure is a system which is designed to fully perform driving maneuvers automatically or autonomously or at least to support the driver in performing them. The vehicle thus carries out all the necessary functions, such as steering, braking and/or acceleration maneuvers, the observation and detection of road traffic and corresponding reactions (partially) automatically. Known examples of a driver assistance system are a lane assist, a distance keeping assistant (distance cruise control) and/or an automatic cruise control (ACC) or combinations thereof.

In a further embodiment, in connection with the stopping maneuver, it is provided that the adjusting of the interior element is only performed if a standstill value is detected or is present which represents a vehicle standstill.

The respective adjustment measure is therefore only performed when the vehicle has come to a complete stop, i.e., its standstill has been detected. The standstill value can be, for example, a wheel speed of a wheel speed sensor or a speed value of a speed sensor (wheel speed=0, speed=0). In addition, a geographical position of the vehicle in the environment can be taken into account. For example, the adjustment measure can only be performed if a captured geographical position (location) corresponds to a specified stopping position. The stopping position can be a target position that the vehicle should assume after the stopping maneuver has been completed. This can prevent the vehicle from stopping in the middle of a road, for example in a traffic jam or at a traffic light.

According to a further embodiment, the support measure comprises controlling a communication device assigned to the vehicle to send out an emergency call signal for an emergency service. Medical personnel can thus be called in an automated manner to care for the occupant. The emergency call signal can be used to transmit personal data and location data of the vehicle, for example. This allows the emergency services to be directed to the location where the vehicle has come to a standstill. The emergency services can be, for example, a fire brigade, an ambulance, police force or central emergency services.

Of course, additional or alternative support measures can be carried out or performed by activating the emergency assistance system. For example, while the stopping maneuver is being performed and/or at a standstill, the vehicle's hazard warning lights, i.e., a direction indicator system, can be activated to signal to other road users that the vehicle's emergency protocol has been initiated. Additionally or alternatively, when the vehicle is at a standstill, an unlocking mechanism for a vehicle door can be automatically activated and the door can be unlocked. Additionally or alternatively, at a standstill, a seat belt system, i.e., a belt for buckling up the respective occupant, can be unlocked.

According to a further embodiment, the occupant state signal is determined by capturing at least one vital sign and/or an attention parameter of the occupant. For this purpose, the respective captured parameter is evaluated, for example, to check whether the specified pathological state exists (or not). The occupant state signal is only generated if the pathological state exists. The generated occupant state signal can then be detected or captured.

The vital sign can, for example, be at least one health value and/or vital value of the occupant, meaning a measured quantity for a body function of the occupant. For example, a heart rate, a blood oxygen value, a skin conductance value or a blood sugar value can be captured as a vital value. Additionally or alternatively, for example, the skin color of the occupant, i.e., whether the occupant suddenly turns pale, the frequency of an eyelid blink, i.e., a blinking frequency, and/or pupil size can be measured as a vital value. As attention parameters can be captured, for example, activity data of the occupant, which indicates whether the occupant has carried out a specified operating action to drive or generally use vehicle functions of the vehicle or not. For this purpose, it can be checked, for example, whether a specified number of activity values were captured or measured in a specified time interval. This is preferably performed individually or separately for each occupant of the vehicle. The operating action to drive the vehicle can be, for example, a steering intervention, a braking intervention and/or an acceleration intervention. Thus, it can be measured whether the steering, accelerator or brake pedal has been operated. For this purpose, it is sufficient, for example, if the occupant touches the corresponding control element, i.e., the driver puts their hand on the steering wheel. The operating action to use a vehicle function can, for example, be an action to set up a comfort system, such as an infotainment system, air conditioning or window lifter. As an activity value is then checked, for example, to see whether a corresponding operating element or actuator has been actuated. To capture the vital sign and/or attention parameter, a suitable capturing device can be provided inside or outside the vehicle with one or more sensors. The specific implementation of such a capturing device will be discussed in more detail below.

The captured data or values can be evaluated using evaluation electronics, such as a vehicle control unit, to determine whether the pathological state exists or the extent of impairment based on the captured parameter, in order to activate the emergency assistance system. For evaluation, the captured data or values can be compared with specified reference data. The reference data can be characteristic of a predetermined pathological state or a specific clinical picture. The reference data can, for example, comprise a threshold value. When the threshold value is exceeded or the captured data or values match the reference data at least within a predetermined approximation range, it can be concluded that the pathological state exists. It can then be assumed that the occupant can or should no longer participate in road traffic, so that the emergency protocol is triggered.

According to a further embodiment, the occupant state signal is captured by way of the previously mentioned capturing device. The capturing device is, for example, an interior camera of the vehicle and/or a vital sign measuring device inside or outside the vehicle. As is well-known, observation data of the occupant can be captured in a manner known per se by way of an interior camera. By evaluating the observation data, for example using an appropriate image analysis method, it can be determined whether the aforementioned vital sign or attention parameter is present.

A vital sign measuring device can, for example, be a pulse oximeter, a blood pressure monitor, a heart rate monitor or another specified measuring device for capturing vital signs. The measuring device can be implemented outside the vehicle, for example in a mobile device or a so-called "wearable," i.e., a computer system integrated into the occupant's clothing or worn directly on the body, such as, for example, a smartwatch or a heart rate belt. For this purpose, the measuring device outside the vehicle can be coupled to the vehicle for data transmission. Alternatively, the measuring device or its sensors can be integrated directly into the vehicle structure and thus be implemented inside the vehicle.

Additionally or alternatively, the capturing device can be designed as an actuation sensor or touch sensor of the vehicle. An actuation sensor can be an acceleration sensor, for example. Said sensor can measure an acceleration that the steering wheel experiences, for example, when the driver makes a steering movement and/or that acts on an accelerator/brake/clutch pedal, for example, when the driver actuates it. The touch sensor can be a sensor or sensor array that can capture the touch or at least the presence of at least one body part (e.g., hand, finger, or foot) of the occupant in a specified capturing range of the sensor. The touch sensor can, for example, comprise a capacitive sensor and/or an optical sensor, for example based on a light barrier or a light reflection on the body part.

One aspect of the disclosure can also relate to a control device for the vehicle. The control device can have a data processing device or a processor device that is set up to perform the method according to the disclosure, an embodiment of the method or at least one method step. For this purpose, the processor device can have at least one microprocessor and/or at least one microcontroller and/or at least one FPGA (Field Programmable Gate Array) and/or at least one DSP (Digital Signal Processor). Furthermore, the processor device can have program code that is set up to perform the embodiment of the method according to the disclosure when executed by the processor device. The program code can be stored in a data memory of the processor device. The method steps can be encoded in the program code.

The data memory can be designed as a computer-readable storage medium. Said data memory comprises the program code and thus commands which, when executed by a computer or a computer network, for example the aforementioned control device, cause it to carry out the desired embodiment of the method. The storage medium can, for example, be configured at least partially as a non-volatile data memory (for example as a flash memory and/or as an SSD-Solid State Drive) and/or at least partially as a volatile data memory (for example as a RAM-Random Access Memory). The aforementioned processor circuit with the at least one microprocessor can be provided by the computer or computer network. The commands can be provided as binary code or assembler and/or as source code in the programming language, for example C.

The disclosure also relates to an emergency assistance system for a vehicle which is designed to perform or carry out the method as described above, or at least one embodiment thereof or at least one method step of the method. The emergency assistance system can, for example, be included in the aforementioned control device of the vehicle or be designed as the control device. The emergency assistance system can be set up in particular to initiate the support measure and to perform the adjustment measure. If the method is performed entirely by way of the emergency assistance system, the method step of activating the emergency assistance system refers in particular to said previously described activating of the emergency protocol for triggering the support measure.

Furthermore, the disclosure also relates to a vehicle with at least one interior element whose position in the interior is adjustable, and the associated adjustment drive and an emergency assistance system that is designed to adjust the at least one interior element to a specified target position. In this case, the emergency assistance system is designed to perform the method described above. The vehicle according to the disclosure can be a motor vehicle and is preferably configured as a motor vehicle, in particular as a passenger car or truck, or as a passenger bus or motorcycle.

For applications or application situations that may arise during the method and that are not explicitly described here, it can be provided that, according to the method, an error message and/or a prompt to enter user feedback is issued and/or a standard setting and/or a predetermined initial state is set.

The disclosure also includes refinements of the emergency assistance system and vehicle according to the disclosure, which have features as have already been described in connection with the refinements of the method according to the disclosure. For this reason, the corresponding refinements of the emergency assistance system and vehicle according to the disclosure are not described again here.

The disclosure also comprises combinations of the features of the described embodiments. The disclosure therefore also comprises implementations that each have a combination of the features of several of the described embodiments, provided that the embodiments were not described as mutually exclusive.

BRIEF DESCRIPTION OF THE SEVERAL VIEWS OF THE DRAWINGS

Exemplary embodiments of the disclosure are described below. In this regard.

DETAILED DESCRIPTION

Figure 1:
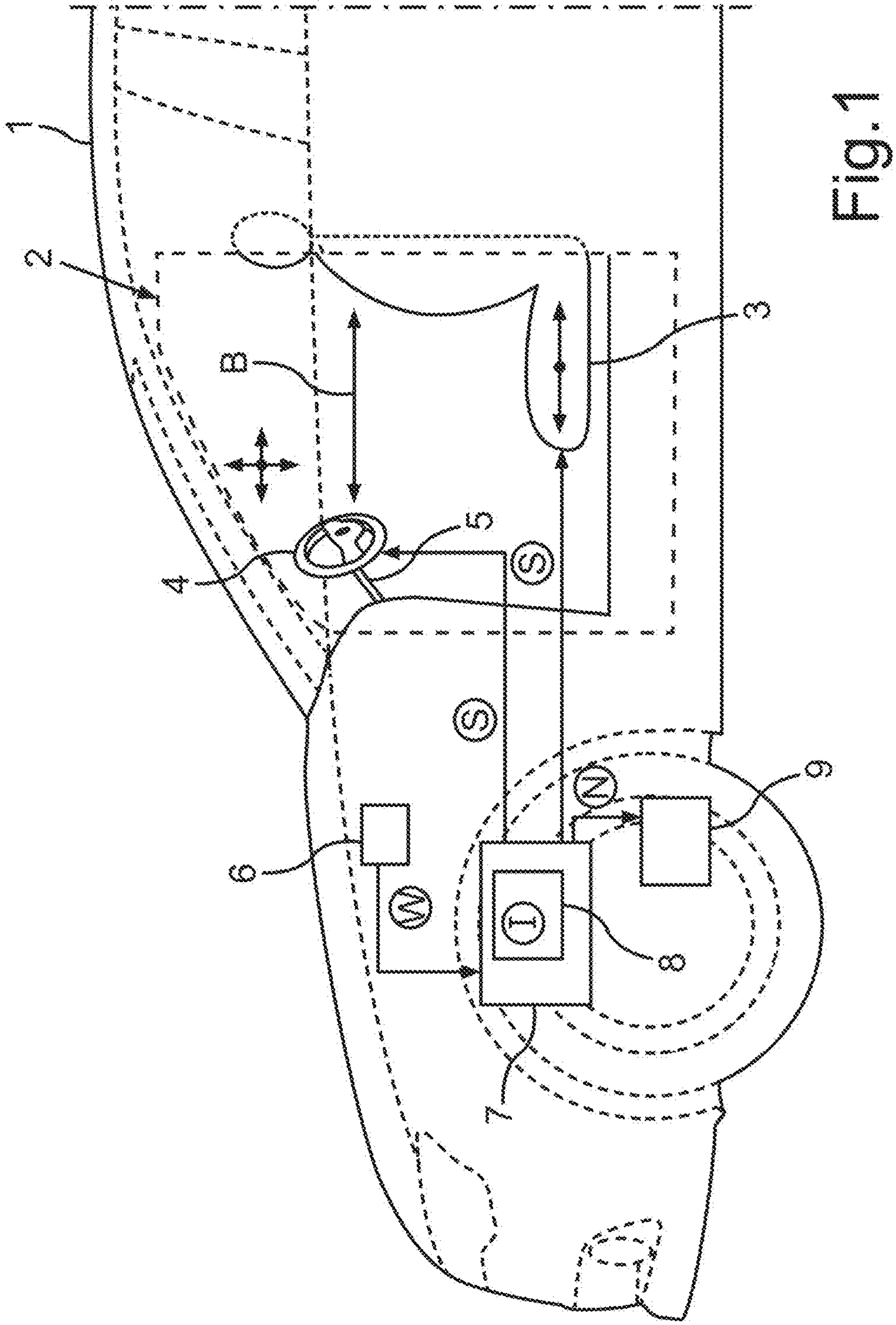
FIG. 1 shows a schematic representation of a vehicle having an emergency assistance system.

The exemplary embodiments explained below are advantageous embodiments of the disclosure. In the exemplary embodiments, the components of the embodiments described each represent individual features of the disclosure that are to be considered independently of one another, which also each refine the disclosure independently of one another. Therefore, the disclosure should also comprise combinations of the features of the embodiments other than those shown. Furthermore, the described embodiments can also be supplemented by further features of the disclosure already described.

In the figures, same reference numerals denote functionally identical elements.

FIG. 1 shows a schematic representation of a section of a front area of a vehicle from a side perspective in a sectional representation. In FIG. 1, a driver's area is shown in particular, i.e., an area in which, for example, a driver of the vehicle as an occupant can take their position to drive vehicle 1. The occupant is not shown in FIG. 1 for better clarity. In the present case, vehicle 1 is designed as a passenger car, for example.

A door frame 2 of the body of the vehicle for a driver's door is indicated by way of example in dashed lines. FIG. 1 shows the view of the driver's area from an environment into the interior of vehicle 1 through door frame 2. A vehicle seat 3 and a steering wheel 4 are arranged in the driver's area. Steering wheel 4 is connected by way of a steering column to a drive train of the vehicle (not shown in FIG. 1). Steering wheel 4 and the vehicle seat, in the present case in particular the driver's seat, are interior elements of vehicle 1. In the present exemplary embodiment, both are designed to be adjustable in a manner known per se. The suitability for adjusting and exemplary possible adjustment directions are indicated in FIG. 1 by directional arrows drawn next to steering wheel 4 or vehicle seat 3. In the exemplary embodiment, vehicle seat 3 is thus designed forwards and backwards, i.e., in the direction of the front or rear area of vehicle 1 (in the illustration, directional arrows pointing left and right). In addition to being adjustable forwards and backwards, steering wheel 4 is also designed to be adjusted up and down, i.e., in the direction of the vehicle roof and vehicle floor or driving surface (directional arrows pointing left and right and up and down in the illustration). Of course, combinations of the adjustment directions shown or adjustment directions other than those shown are also possible.

A respective adjustment drive (not shown in FIG. 1) is provided for adjusting the interior elements. By controlling the adjustment drive, the respective interior element can thus be adjusted in its position in the interior of vehicle 1 to a desired target position.

In addition to the interior elements, vehicle 1 also comprises a capturing device 6. The capturing device is designed to capture an occupant state, in particular a pathological or medical state, of the occupant, for example in the form of an occupant state value W.

Vehicle 1 also comprises a control device 7 having an emergency assistance system 8. Control device 7 can be, for example, a central on-board computer or a control unit of vehicle 1. Emergency assistance system 8 can be included in control device 7 as a control unit or a control device. Emergency assistance system 8 can thus form a functional unit of control device 7. As a result, control device 7 can, for example, provide a data memory and a processor, while the function of emergency assistance system 8 is stored, for example, as program code or part of a program code in the data memory for execution by the processor. In addition to emergency assistance system 8, the control device can, for example, also comprise other systems with a different function. This can be, for example, a driver assistance system. As an alternative to the exemplary embodiment shown, emergency assistance system 8 can be designed as a separate control device or a control device-external control unit.

In the present case, emergency assistance system 8 is used to identify whether the occupant has a specified pathological state that limits or impairs their ability to drive vehicle 1 to a specified extent. In the present case, such a pathological state is, for example, a specified clinical picture, such as a heart attack, a stroke or fainting. The support measure can then be initiated by way of emergency assistance system 8 and the adjustment measure for adjusting the respective interior element can then be performed. The aim is to choose a target position for the interior elements in such a way that a movement space B delimited by the interior element(s) is increased for the occupant for entry into or exit from the vehicle. This can ensure that, for example, emergency service personnel can particularly easily rescue the affected occupant from the vehicle.

Figure 2:
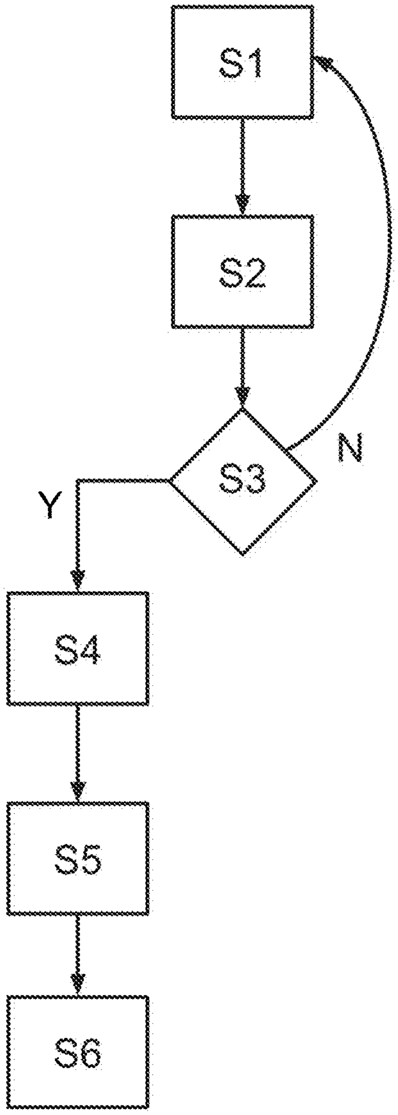
FIG. 2 shows a schematic method flow diagram for a method for adjusting at least one interior element of the vehicle, which can be carried out by way of the emergency assistance system.

For this purpose, steps of an emergency protocol that emergency assistance system 8 can carry out are described in connection with FIG. 2. For this purpose, FIG. 2 shows a schematic representation of a method flow diagram which describes individual steps of a method for adjusting at least one of the interior elements of vehicle 1 according to FIG. 1.

In the method, in a step S1, the occupant state value W is first captured or measured by way of capturing device 6. The occupant state value W describes a measured quantity for a body function and indicates the state of health or the pathological state of the occupant. Occupant state value W can thus be referred to as a health value; in particular, it indicates whether the occupant is ill or healthy. Occupant state value W can be captured, for example, by an attention parameter or a vital sign.

As an attention parameter, occupant state value W can be present, for example, as an activity value or in the form of activity data, which indicates that the occupant is carrying out or has carried out a specified operating action for driving or generally using vehicle functions of a vehicle 1. For this purpose, in the present case, capturing device 6 can be designed, for example, as an acceleration sensor and/or a touch sensor and integrated into steering wheel 4. If the occupant carries out a steering movement by moving the steering wheel, this can be registered as an activity value. Alternatively, an operating input by the occupant to operate an accelerator or brake pedal or another vehicle system, such as an infotainment system, can be captured as an activity value. Alternatively, the capturing device can be designed, for example, as an interior camera in order to determine the activity of the occupant optically, for example by way of image analysis. For example, as the activity value, it can be determined whether and how often the occupant blinks in order to detect fainting. The attention parameters therefore represent indirect evidence of a pathological state.

In order to measure the pathological state directly, however, occupant state value W can be determined as a vital sign, for example. For this purpose, at least one vital value can be measured as occupant state value W of the occupant. A vital value is, for example, a heart rate or an oxygen saturation or a blood pressure. For this purpose, capturing device 6 can be designed, for example, as a pulse measuring device, or pulse oximeter or blood pressure monitor or combination measuring device.

Capturing device 6 can be formed inside the vehicle or outside the vehicle. Inside the vehicle is understood to mean that the capturing device is an integral part of the vehicle structure. Preferably, all functions are carried out in the vehicle. Outside the vehicle is understood to mean that capturing device 6 is an independent device that can, for example, also carry out the corresponding functions without the components of vehicle 1. Capturing device 6 can, for example, be included in a mobile terminal or a portable medical device.

In a step S2, captured occupant state value W is transmitted to control device 7, in particular emergency assistance system 8, in order to be evaluated. Capturing device 6 is preferably designed to continuously or repeatedly capture and pass on a current occupant state value W. In step S2, for example, possible captured occupant state values W can be captured and temporarily stored by emergency assistance system 8 for a predetermined period of time or a specified time interval. Occupant state values W can thus be present, for example, as occupant state values (time course of the values).

In a step S3, it is then checked whether the pathological state exists or not. For this purpose, for example, the occupant state data can be compared with specified reference data and/or respective occupant state value W with a specified reference value. The reference data and/or the reference value are/is a measure of whether the pathological state, i.e., the predetermined clinical picture, exists for the monitored occupant or not.

For occupant state values W, the reference data can comprise a limit value or a threshold value as a reference value. For example, when evaluating, it can be checked whether, for example, a specified number of activity values and/or a specified duration of activity was captured in a specified time interval. If sufficient activity values were recorded, it can be concluded that the occupant is alert and thus no pathological state exists; otherwise it can be assumed that the occupant is ill (a pathological state exists). Additionally or alternatively, the reference value can indicate, for example, a minimum heart rate and/or maximum heart rate for the vital value. Outside a range delimited by the minimum and maximum heart rate, it can be concluded that the pathological state exists; otherwise it can be assumed that the occupant is healthy (no pathological state exists).

If it is determined in step S3 by comparison with the reference data that no pathological state exists (X), the method can be continued again at step S1. If, however, the pathological state is identified (Y), the method continues at step S4. In step S4, an occupant state signal I is generated. The occupant state signal I signals that the specified pathological state of the occupant exists and the occupant is therefore at least partially or completely unable to continue to participate in traffic.

If occupant state signal I is present and can thus be detected by emergency assistance system 8, the method continues at step S5. At step S5, support system 9 of vehicle 1 is activated by way of emergency assistance system 8. For this purpose, emergency assistance system 8 can control support system 9 with an emergency signal N. By controlling it with the emergency signal N, support system 9 can perform a support measure for the occupant. In the present case, the support system is designed, for example, as a driver assistance system, in particular as an autopilot. The support measure can thus be automated or autonomous driving or controlling the vehicle. The aim can be to carry out a stopping maneuver and bring the vehicle to a standstill so that an emergency service can care for the occupant. For this purpose, emergency assistance system 8 can, for example, control a driving-supporting actuator of the vehicle, such as a lane assist and/or an automatic cruise control (ACC) of the vehicle. Vehicle 1 can thus be brought to a controlled stop.

As soon as the vehicle is at a standstill after the stopping maneuver, preferably at the desired target position that was controlled by the stopping maneuver, the method continues at step 6. At step S6, the desired adjustment measure is carried out. Alternatively, the method can, for example, only continue at step S6 if the emergency signal N is present.

To perform the adjustment measure, the respective interior element, in the present case, for example, vehicle seat 3 and/or steering wheel 4, are/is controlled with a control signal S in order to be adjusted to the given target position. In doing so, steering wheel 4 and/or vehicle seat 3 can, for example, be brought into an end position (target position) which creates the greatest possible distance between the two interior elements and thus the maximum possible movement space for the occupant. The emergency service can therefore rescue the occupant from the vehicle much more easily because the steering wheel and/or the driver's seat no longer represent an obstacle. In addition, when setting the target position, an entry area which is delimited by door frame 2 can also be taken into account, for example. The target position for vehicle seat 3 and/or steering wheel 4 can thus be chosen to the effect that the body does not cover the exit area. As a result, movement space B can be maximized. In the present case, a preferred target position can, for example, be to move the vehicle seat back so far that, in the side view shown, the B-pillar, which delimits the door frame from the rear side, just covers it. Alternatively, in the target position, the vehicle seat can of course be moved completely to the rear or backwards. The target position for the steering wheel can, for example, be set so that steering wheel 4 is just covered by the A-pillar of the vehicle, which delimits the door frame from the opposite side. Alternatively, in the target position, steering wheel 4 can be adjusted to the very front and to the very top, for example.

In summary, it is about identifying that the emergency assistant has been activated to initiate the support measure and, for example, that vehicle 1 is being or has been stopped. An additional or alternative support measure can, for example, be to send an emergency call, i.e., an emergency call signal, to a rescue service by way of a communication device of vehicle 1.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for adjusting at least one interior element of a vehicle, comprising:

detecting an occupant state signal which signals that a specified pathological state of an occupant of the vehicle at least restricts an ability of the occupant to drive the vehicle to a specified extent;

activating an emergency assistance system of the vehicle and providing an emergency signal to carry out at least one support measure for the occupant; and while the emergency signal is present, controlling an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein a seat adjustment drive of a vehicle seat and/or a steering wheel adjustment drive of a steering wheel is controlled to increase the movement space.

2. A method for adjusting at least one interior element of a vehicle, comprising:

detecting an occupant state signal which signals that a specified pathological state of an occupant of the vehicle at least restricts an ability of the occupant to drive the vehicle to a specified extent;

activating an emergency assistance system of the vehicle and providing an emergency signal to carry out at least one support measure for the occupant; and while the emergency signal is present, controlling an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein the specified target position of the at least one interior element is chosen based on an access area provided in a body of the vehicle for the occupant to enter into the vehicle, so that the movement space delimited by the at least one interior element and the access area is increased.

3. A method for adjusting at least one interior element of a vehicle, comprising:

detecting an occupant state signal which signals that a specified pathological state of an occupant of the vehicle at least restricts an ability of the occupant to drive the vehicle to a specified extent;

activating an emergency assistance system of the vehicle and providing an emergency signal to carry out at least one support measure for the occupant; and while the emergency signal is present, controlling an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein the at least one support measure comprises controlling at least one driving-supporting actuator of the vehicle with the emergency signal to perform a stopping maneuver.

4. The method according to claim 3, wherein the at least one interior element is adjusted when a standstill value that represents a vehicle standstill is detected.

5. The method according to claim 1, wherein the at least one support measure comprises controlling a communication device assigned to the vehicle to send out an emergency call signal for an emergency service.

6. The method according to claim 1, wherein the occupant state signal is determined by capturing at least one vital sign and/or an attention parameter of the occupant.

7. The method according to claim 1, wherein the occupant state signal is captured by way of an interior camera of the vehicle and/or by way of a vital sign measuring device inside or outside the vehicle, and/or by way of an actuation sensor of the vehicle.

8. An emergency assistance system for a vehicle that includes at least one interior element, the emergency assistance system comprising:

a processor device; and a memory storing program code that, when executed by the processor device, causes the emergency assistance system to:

detect an occupant state signal which signals that a specified pathological state of an occupant of the vehicle at least restricts an ability of the occupant to drive the vehicle to a specified extent;

activate an emergency assistance system of the vehicle and provide an emergency signal to carry out at least one support measure for the occupant; and while the emergency signal is present, control an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein a seat adjustment drive of a vehicle seat and/or a steering wheel adjustment drive of a steering wheel is controlled to increase the movement space.

9. The emergency assistance system according to claim 8, further comprising:

the vehicle that includes the at least one interior element.

10. An emergency assistance system for a vehicle that includes at least one interior element, the emergency assistance system comprising:

a processor device; and a memory storing program code that, when executed by the processor device, causes the emergency assistance system to:

detect an occupant state signal which signals that a specified pathological state of an occupant of the vehicle at least restricts an ability of the occupant to drive the vehicle to a specified extent;

activate an emergency assistance system of the vehicle and provide an emergency signal to carry out at least one support measure for the occupant; and while the emergency signal is present, control an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein the specified target position of the at least one interior element is chosen based on an access area provided in a body of the vehicle for the occupant to enter into the vehicle, so that the movement space delimited by the at least one interior element and the access area is increased.

11. An emergency assistance system for a vehicle that includes at least one interior element, the emergency assistance system comprising:

a processor device; and a memory storing program code that, when executed by the processor device, causes the emergency assistance system to:

detect an occupant state signal which signals that a specified pathological state of an occupant of the vehicle at least restricts an ability of the occupant to drive the vehicle to a specified extent;

activate an emergency assistance system of the vehicle and provide an emergency signal to carry out at least one support measure for the occupant; and while the emergency signal is present, control an adjustment drive of the at least one interior element, wherein a position of the at least one interior element is adjusted to a specified target position, wherein, in the specified target position, a movement space delimited by way of the at least one interior element is increased for entry and/or exit of the occupant, and wherein the at least one support measure comprises controlling at least one driving-supporting actuator of the vehicle with the emergency signal to perform a stopping maneuver.

* * * * *